(12) United States Patent
Schneider (10) Patent No.: US 8,179,242 B2
(45) Date of Patent: May 15, 2012

(54) VIRTUAL ENGINE OIL QUALITY SENSOR (75) Inventor: Eric W. Schneider, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 550 days.

(21) Appl. No.: 11/951,370

(22) Filed: Dec. 6, 2007

(65) Prior Publication Data
US 2009/0145211 A1 Jun. 11, 2009

(51) Int. Cl.
B60Q 1/00 (2006.01)
G09B 21/00 (2006.01)
G01N 33/28 (2006.01)

(52) U.S. Cl. .................. 340/438; 340/457.4; 340/4.12; 340/450.3; 356/70

(58) Field of Classification Search .................. 340/438, 340/457.4, 4.12, 450.3; 701/29, 30; 356/70
See application file for complete search history.

(56) References Cited

U.S. PATENT DOCUMENTS

| 6,429,773 | B1 * | 8/2002 | Schuyler ..................... 340/425.5 |
| 6,568,436 | B1 | 5/2003 | Matthews et al. |
| 6,580,366 | B1 * | 6/2003 | Engfehr ...................... 340/457.4 |
| 6,912,479 | B2 * | 6/2005 | Ryu et al. ........................ 702/183 |
| 7,493,799 | B1 * | 2/2009 | Discenzo ...................... 73/53.05 |
| 7,647,202 | B2 * | 1/2010 | Lamontagne .................. 702/182 |
| 7,729,870 | B2 * | 6/2010 | Sun .................................. 702/52 |
| 2003/0004624 | A1 * | 1/2003 | Wilson et al. .................... 701/33 |
| 2004/0178900 | A1 * | 9/2004 | Berndorfer et al. ......... 340/450.3 |
| 2007/0124039 | A1 * | 5/2007 | Sakurai et al. ................... 701/29 |
| 2008/0024761 | A1 * | 1/2008 | Kong et al. ...................... 356/70 |

FOREIGN PATENT DOCUMENTS

| EP | 1363123 A2 | 11/2003 |
| KR | 1020020028469 A | 4/2002 |

OTHER PUBLICATIONS

Bary W. Wilson et al., "Modular System for Multi-Parameter In-Line Machine Fluid Analysis", Adaptation of Machine Fluid Analysis for Manufacturing Final Report, Aug. 2005, National Technical Information Service, U.S. Department of Commerce, Springfield, VA.

* cited by examiner

Primary Examiner — Toan N Pham
Assistant Examiner — Fekadeselassie Girma (57) ABSTRACT A method for diagnosis of oil quality within an internal combustion engine includes analyzing input data from an oil level sensor and generating a warning if the input data includes an oil level change indicative of a sub-standard oil quality condition.

9 Claims, 5 Drawing Sheets

VIRTUAL ENGINE OIL QUALITY SENSOR

TECHNICAL FIELD

This disclosure is related to on-board diagnostic testing in internal combustion engines.

BACKGROUND

Oil performs critical roles in an engine including lubrication of rapidly moving parts and providing fluidic support to the crankshaft journal bearing. Oil used in an engine is exposed to high temperatures and adverse conditions over durations of engine operation. Oil quality degrades over time and usage, and the oil must periodically be replaced. Two primary modes of oil quality degradation include oxidation and contamination.

Oxidation is a predictable outcome of oil use within a combustion engine. One known method to protect against oil oxidation within an engine is to estimate the oil quality over time and prescribe oil changes after a given time elapsed interval or distance traveled interval. However, estimating optimal intervals between oil changes is an imprecise method to estimate a required oil change. Oxidation does not occur at a constant rate and may be affected by many factors, including the operating temperature for the oil, with higher temperatures causing more rapid oxidation. An optimal interval between oil changes for one vehicle may be very different from the optimal interval for another vehicle based on these factors. Another known method to protect against oil oxidation within an engine is to perform chemical analyses of the oil. Oxidation produces chemical by-products and may be quantified by analyzing oil samples. These chemical analyses may be utilized to improve the accuracy of oil oxidation estimates, but these analyses are difficult to perform, and must either be performed outside the vehicle in a repair shop or require expensive additional equipment to perform on-board the vehicle.

Contamination is another mode of oil quality degradation. Many sources of oil contamination exist, but water and fuel are the most typical contaminants in oil. One known exacerbating circumstance to oil contamination is short trip usage. Both water and fuel have lower boiling points than oil and will evaporate out of an oil-contaminant mixture when the oil gets up to certain operating temperatures. Vehicles are designed such that normal operating temperatures will purge water and fuel from the oil. However, if a vehicle is used only on short trips where the engine is not permitted to reach normal operating temperatures, the water and fuel contaminants accumulate and remain in the oil. These contaminants interfere with the operation of the oil throughout the engine and, if present in sufficient quantities, cause engine damage.

SUMMARY

A method for diagnosis of oil quality within an internal combustion engine includes analyzing input data from an oil level sensor and generating a warning if the input data includes an oil level change indicative of a sub-standard oil quality condition.

BRIEF DESCRIPTION OF THE DRAWINGS

One or more embodiments will now be described, by way of example, with reference to the accompanying drawings, in which:

FIG. 5 depicts a vehicle operated under short trip driving conditions;

FIG. 6 depicts a vehicle operated first under normal driving conditions for a period and then operated under short trip driving conditions for a period;

FIG. 7 depicts a vehicle undergoing a top-off event;

FIG. 8 depicts a vehicle operated first under normal driving conditions for a period and then operated under short trip driving conditions for a period, said vehicle undergoing a top-off event during the period of short trip driving conditions.

DETAILED DESCRIPTION

Figure 1:
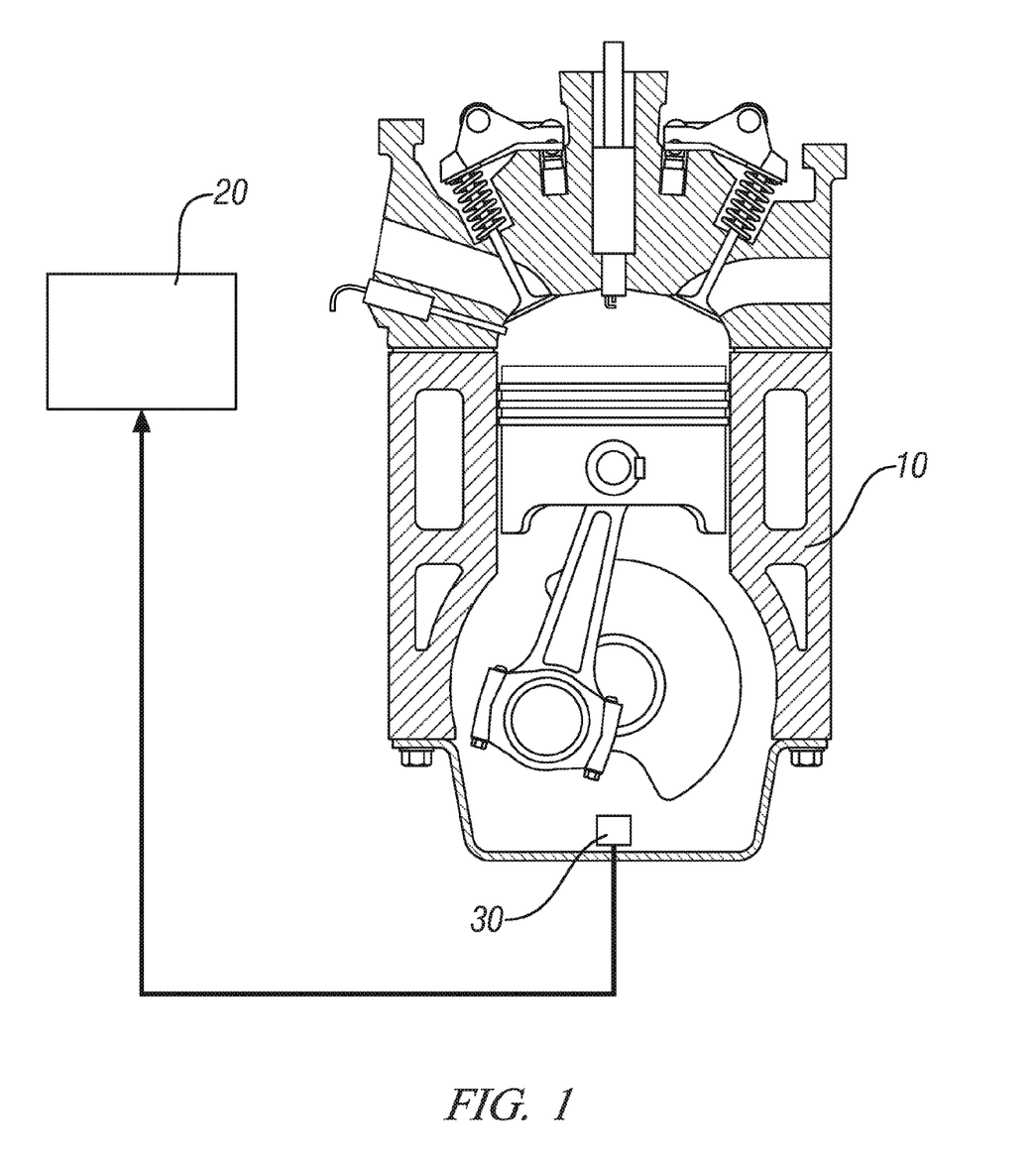
FIG. 1 is a cross-sectional schematic illustration of an exemplary arrangement of an engine, a control module, and an oil level sensor in accordance with the present disclosure.

Referring now to the drawings, wherein the showings are for the purpose of illustrating certain exemplary embodiments only and not for the purpose of limiting the same, FIG. 1 graphically depicts an exemplary embodiment of an engine 10 being monitored by a control module 20 through an oil level sensor 30. Recent developments in oil level sensors in combination with oil level estimation algorithms allow accurate oil level estimation to error levels of less than a millimeter. These improved oil level measurements enable the use of algorithms to evaluate trends in oil levels and the resulting conclusions that may be derived from the trends.

The exemplary engine 10 comprises a multi-cylinder internal combustion engine selectively operative in several states to transmit torque to a transmission (not shown) via an input shaft (not shown), and can be either a spark-ignition or a compression-ignition engine. The engine 10 includes a crankshaft (not shown) operatively coupled to the input shaft of the transmission.

The control module 20 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. The control module 20 has a control algorithm, comprising resident program instructions and calibrations stored in one of the storage mediums and executed to provide the functions of the computer. The control algorithm is executed during preset loop cycles. The algorithm stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, the algorithm may be executed in response to the occurrence of an event.

The aforementioned control module 20 communicates with other control modules, sensors, and actuators via a local area network (hereafter 'LAN') bus. The LAN bus allows for structured communication of states of operating parameters and actuator command signals between the various control modules. The specific communication protocol utilized is application-specific. The LAN bus and appropriate protocols provide for robust messaging and multi-control module interfacing between control module 20 and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

Oil level sensor 30 is a commercially available sensor capable of measuring oil levels in engine 10. Such sensors are well known in the art and will not be described in detail herein.

Referring still to FIG. 1, this particular embodiment of oil level sensor 30 is located in the portion of engine 10 known as the oil pan. Data inputs in the form of oil level readings are collected by control module 20 which is in communication with oil level sensor 30. Algorithms within control module 20 utilize a historical collection of the data inputs to characterize trends in the oil levels.

Two analyses of trends in oil levels have shown to be useful in diagnosing sub-standard oil quality conditions indicative of potential engine damage. The first analysis studies the rate at which the engine consumes oil in the combustion process in order to diagnose the level of oxidation in the oil. Oxidation, a process in which oil degrades over time by reacting with air, is well known in the art as one of the primary causes for eventual oil degradation leading to engine damage. Oxidation is a chemical reaction in the oil in which the oil molecules combine with oxygen and other materials, thereby creating by-product molecules with distinct chemical properties. These new molecules are frequently larger more complex polymer-hydrocarbon chains, and these by-product molecules cause the formation of sludge and varnish. Additionally, oxidation forms acids in the oil. Sludge and varnish increase oil viscosity, reduce the efficient lubrication of the engine, and cause clogging of oil filters and oil lines. The second analysis studies the measured oil-contaminant volume versus the expected oil-contaminant volume in order to diagnose the intrusion of contaminants such as water and fuel into the oil. Water enters the oil through condensation caused by exposure to air and changes in temperature and as a by-product of the combustion process. Fuel enters the oil primarily through blow-by, wherein unburned fuel is pushed from the combustion chamber above the piston, past the piston, and into the crankcase holding the oil. Under normal driving conditions, water and fuel are evaporated out of the engine oil, but if the vehicle is typically driven only for short trips in which the engine does not get up to normal operating temperatures, this evaporation may not occur. Water, fuel, and other contaminants mixed in the oil cause corrosion in engine components. Additionally, the contaminants interfere with the lubrication functions of the oil by changing the oil viscosity and by creating an emulsion or phase separation which can result in deactivation or depletion of the performance additives.

Testing has shown a correlation between oil oxidation and the rate at which oil is consumed in the combustion process. Oil is normally consumed through the operation of the engine. For example, one mode of consumption occurs due to volatilization of constituents at elevated temperatures. Since intermediate products of oil oxidation can involve components with high volatility, the rate of oil consumption due to volatilization can be related to the rate of oxidation.

Figure 2:
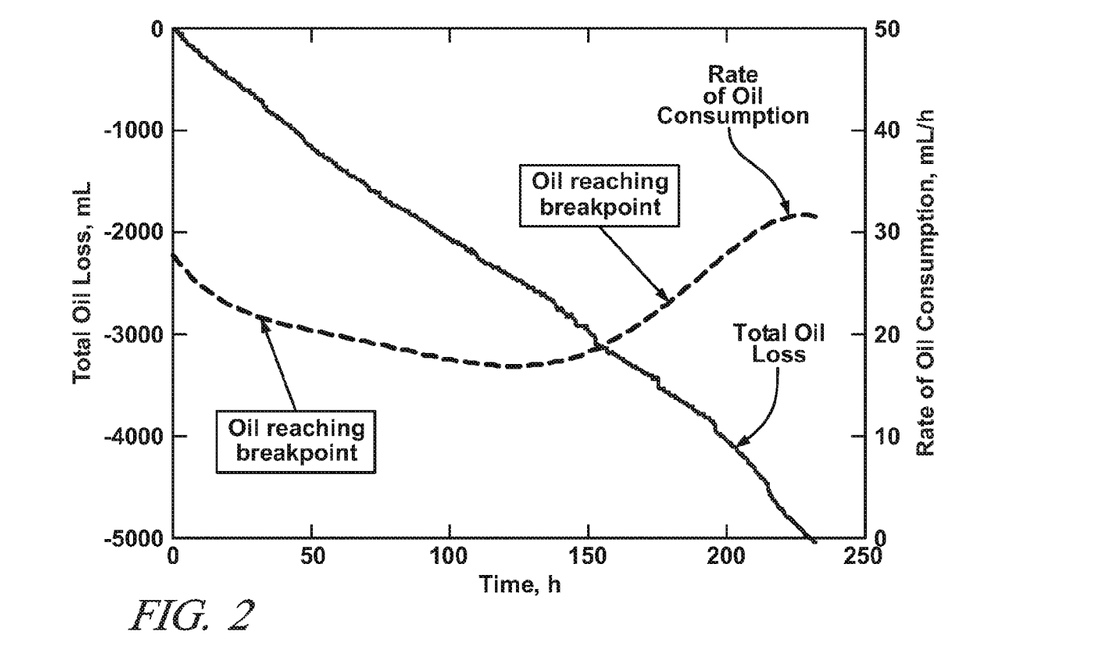
FIG. 2 is a graphical representation of an exemplary rate of oil consumption over the duration of a test in accordance with the present disclosure.

FIG. 2 graphically illustrates a method whereby an oil consumption rate is monitored for an indication of sub-standard oil quality conditions in accordance with the disclosure. The graph depicts both the rate of oil consumption in milliliters per hour and the resulting total oil loss in milliliters over a given time span of engine operation. The oil utilized in this particular test demonstrated an initial reduction in the rate of oil consumption known to be exhibited in many oils during initial use due to the consumption of more volatile light ends or trace hydrocarbons initially present in the oil which quickly dissipate from the oil. The rate of oil consumption continues to decline for some period, but as the oil continues to age over the time span of the test, the rate of the consumption of the oil reverses and begins to increase. This increase in the rate of oil consumption is shown to correlate to the rapid oxidation of the oil after its anti-oxidation capability has been depleted and the resulting creation of volatile by-product molecules. By analyzing the current rate of oil consumption, a warning may be generated indicating significant oxidation has taken place in the oil when the current rate of oil consumption increases by a threshold oil consumption rate increase. In one embodiment, the threshold oil consumption rate increase required to initiate a warning is based upon the rate of oil consumption increasing to a particular value. For example, a warning could be initiated under the conditions illustrated in FIG. 2 for any pattern of input data where the rate of oil consumption is increasing and reaches a rate of 23 mL/h. In another embodiment, the threshold oil consumption rate increase required to initiate a warning is based upon an incremental increase from some reference value such as the point of inflection in FIG. 2 where the oil loss begins to increase or such as an average of values before the inflection point. The point from which the threshold oil consumption rate increase is measured may take many embodiments and is not intended to be limited to the examples described herein. The threshold oil consumption rate increase and the corresponding point generating a warning may be selected based on a number of factors, including the desired advance of the warning generation to actual expected engine damage and the historical operating conditions of the engine.

Figure 3:
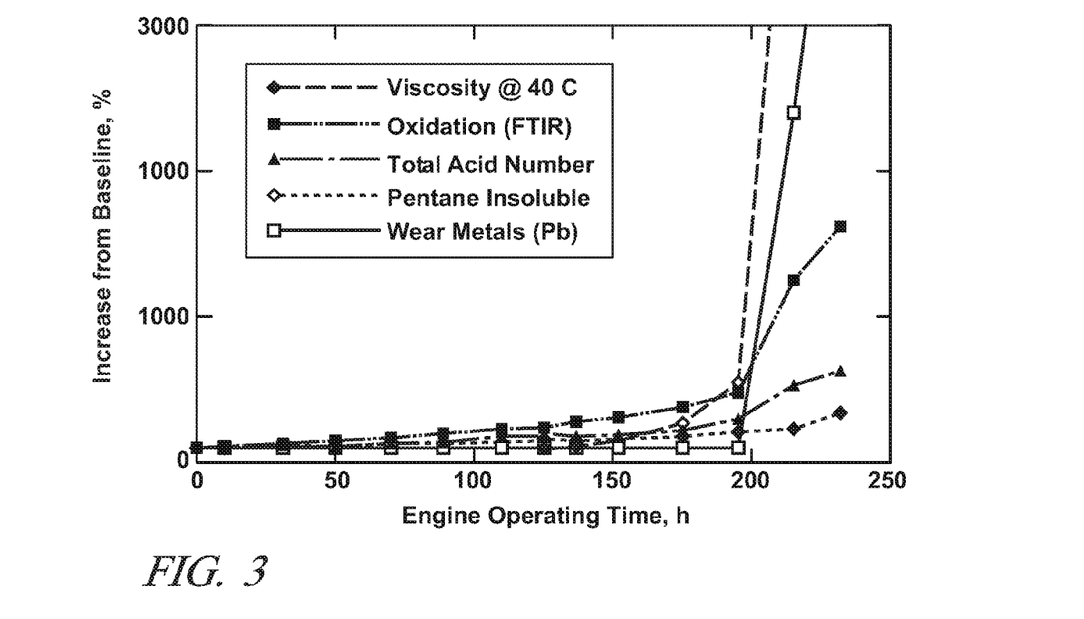
FIG. 3 is a graphical representation of oil properties of the same test sample as described in FIG. 2 in accordance with the present disclosure.

FIG. 3 graphically illustrates additional results from the same test as described by FIG. 2. The graph of FIG. 3 depicts an analysis of chemical components and properties of the oil over the span of the test. The oxidation number is the output of a Fourier transform infrared spectroscopy (FTIR) analysis that provides an estimate of the total amount of oil oxidation. The acid number and the pentane insoluble number track the presence of oxidation by-product molecules in the oil and are useful determine the likelihood of corrosion and sludge formation. The viscosity number is a measure of the resulting viscosity or flow resistance properties exhibited by the oil. The wear metals number is evidence of actual engine damage caused by corrosion or wear. Wear metals are released from engine components such as bearings when adequate oil pressure or corrosion protection is not present. As can be seen by the test results depicted in the graph, the oil clearly reaches a point of sub-standard oil quality conditions just prior to 200 hours, and a warning at some point prior to this time span is warranted to prevent engine damage due to oil oxidation.

Testing has shown a correlation between oil performance degradation and quantities of contaminants present in the oil. Water present in certain quantities in the oil can cause corrosion on metallic surfaces inside the engine and can create emulsions which can remove oil performance additives from the non-polar phase. Fuel contamination of the oil can increase the oxidation rate and can reduce the viscosity of the oil below what is needed for preventing bearing wear. Quantities of contaminants required in oil to cause engine damage may be determined by test data.

Figure 4:
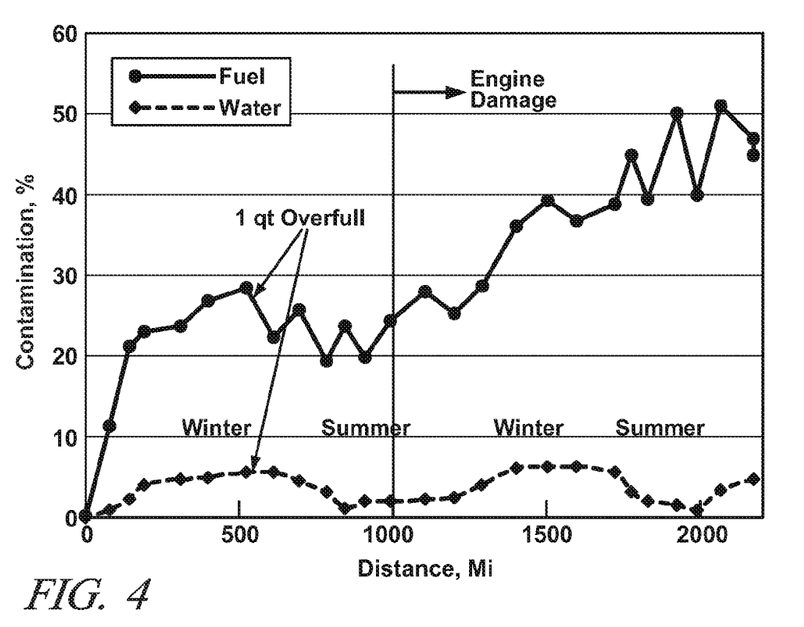
FIG. 4 is a graphical representation of exemplary oil contamination levels over the duration of a test run under short trip circumstances in accordance with the present disclosure.

FIG. 4 graphically illustrates test results wherein oil contaminants are monitored in accordance with the disclosure. Quantities of fuel and water as a percentage of total oil-contaminant volume are plotted versus distance of vehicle travel in miles. The time span of the test was conducted over two yearly cycles to include the effect of colder winter temperatures upon the presence of fuel and water and to include the corrosive effects of warmer summer operation. The vehicle in the test was operated on short trips only, with the engine temperatures remaining well below the normal operating temperature. This particular test setup included an engine for which one quart of contaminants had been determined to be sufficient to cause engine damage. The results of this test demonstrated the presence of increased levels of contaminants in the winter portions of the test, including a one quart overfull contamination condition during the first winter of the test. Examination of the engine the summer following the one quart overfull contamination indicated engine damage due to corrosion. A warning indicating contaminants present in quantities likely to cause engine damage and indicating the need for an oil change may prevent subsequent engine damage.

FIGS. 5-8 graphically illustrate methods utilized to estimate contamination levels in oil associated with short trip driving in accordance with the disclosure. The methods monitor oil level readings and attribute any gradual rise in oil levels to an accumulation of contaminants. If such a gradual rise indicates a threshold volume increase, a warning is generated indicating oil contamination and prompting an oil change. The threshold volume increase in one exemplary embodiment is selected based upon a set volume, for example, one quart. The threshold volume increase in another embodiment is a function based upon the net effect upon the dilution of the oil, where as the volume of the oil at the start of the increase is reduced, the volume of contaminants indicated by the increase in volume required to generate a warning is also reduced. The threshold volume increase in yet another embodiment is a function including a factor based upon the dilution of oil, as mentioned above, with an additional factor requiring a lesser net effect of dilution to generate a warning as the oil gets closer to the end of its expected life cycle. The calculation of the threshold volume increase may take many embodiments and is not intended to be limited to the examples described herein. The selection of the threshold volume increase may take many factors into account, including the desired advance of the warning generation to actual expected engine damage and the historical operating conditions of the engine including the mileage of the vehicle.

Figure 5:
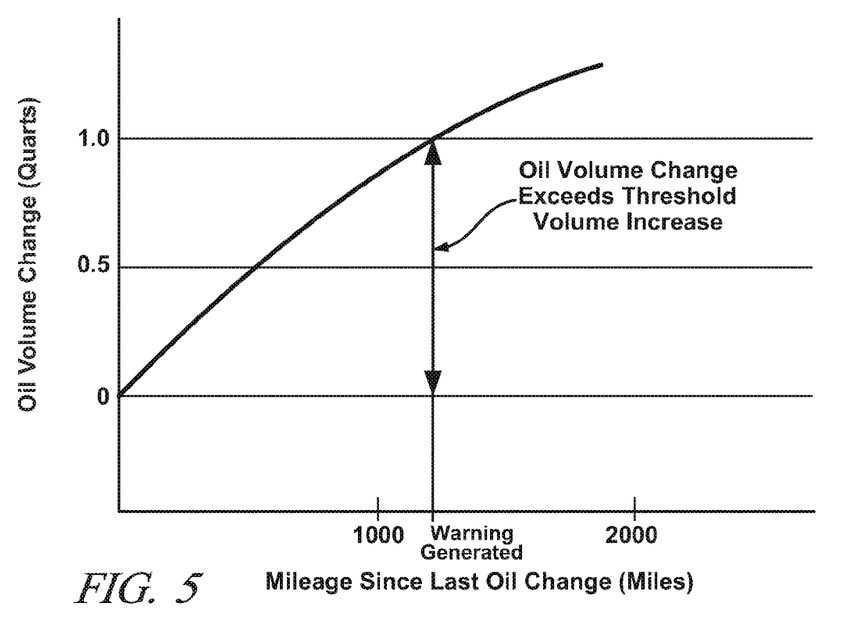
FIGS. 5-8 graphically illustrate methods utilized to estimate contamination levels in oil associated with short trip driving in accordance with the disclosure.

FIG. 5 depicts a vehicle operated solely under short trip driving conditions. Oil level is plotted against miles traveled since the last oil change. As mentioned above, the vehicle is never allowed to reach operating temperatures which would purge contaminants from the oil, and as a result, the oil volume increases after the oil change. The gradual increase in oil level is assumed to be due to contamination, so the threshold volume increase is measured from the initial oil level at the oil change. In this particular embodiment, the threshold volume increase is one quart. Therefore, when the oil volume change exceeds one quart above the initial oil level, a warning indicating excessive oil contamination is generated.

Figure 6:
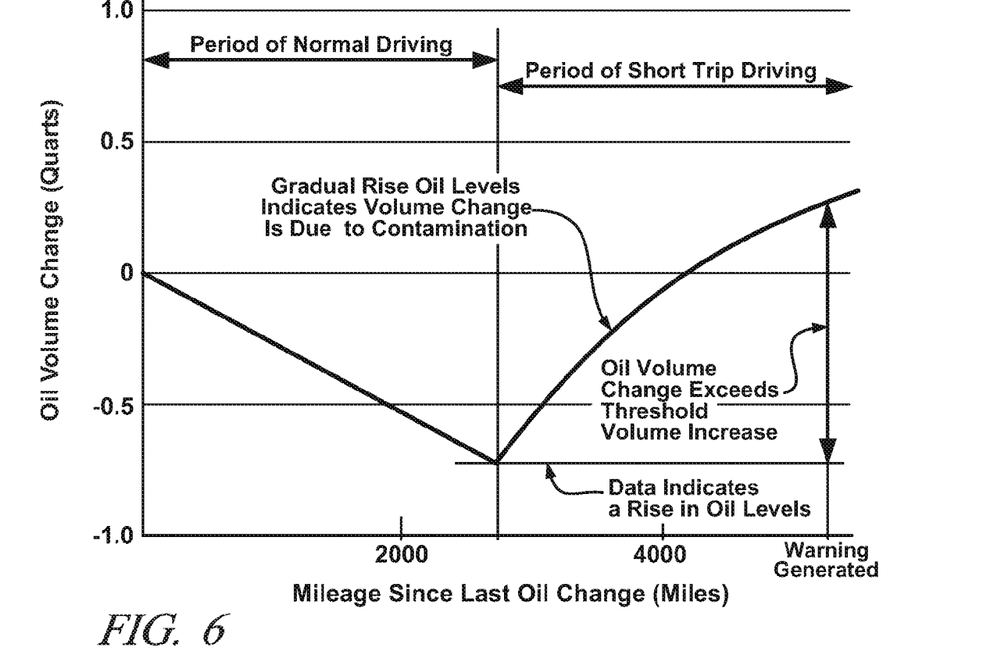

FIG. 6 depicts a vehicle operated under normal conditions for a period and then operated under short trip driving conditions for a period. The oil volume change plotted on the chart initially decreases as expected under normal driving conditions. At a point, the period of normal driving ends and a period of short trip driving begins, and contaminants begin to build up within the oil. As a result, the oil volume change reverses and begins to increase gradually. This inflection point, where the oil level change changes from decreasing to increasing, is identified and the threshold volume increase is measured from this inflection point. In this embodiment, the threshold volume increase is one quart. The inflection point occurs at 0.75 quarts below the initial oil level. Therefore, a gradual change increasing a quart above the inflection point or 0.25 quarts above the initial oil level generates a contamination warning.

Figure 7:
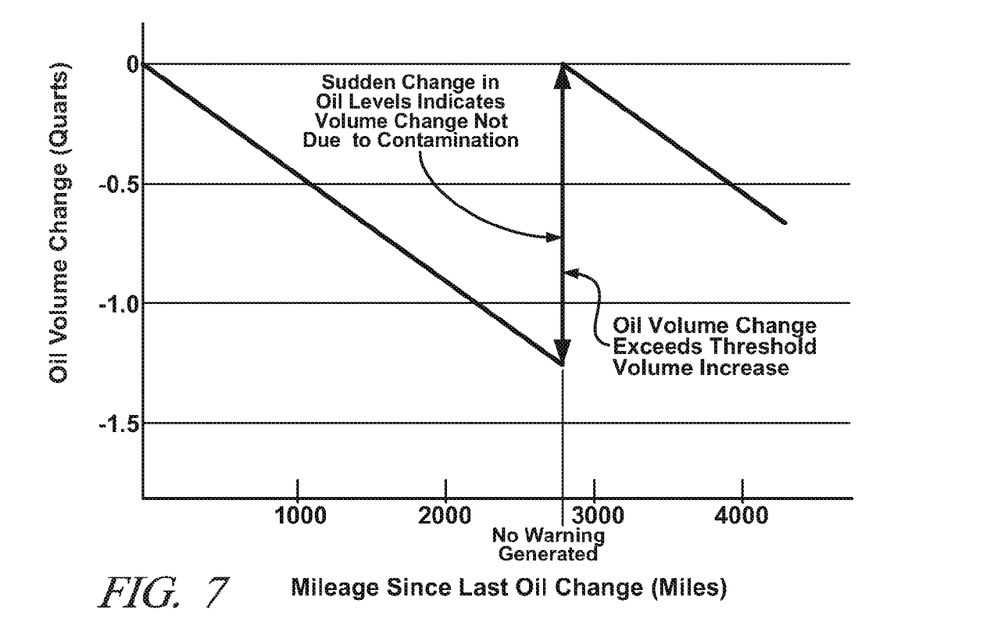

FIG. 7 depicts a vehicle operated under normal conditions experiencing a sudden increase in oil level. The oil level change plotted on this chart is consistent with a vehicle gradually consuming oil under normal operating conditions. At a point, the oil level change is suddenly increased in a step fashion. Contamination consistent with short trip driving only occurs gradually. Sudden increases in oil level change tend to indicate a top-off event, where the operator intentionally replenishes the vehicle with oil. In the present example, the oil level change indicated on the chart, although in excess of a programmed threshold volume increase, does not generate a contamination warning because the sudden increase is not consistent with contamination.

Figure 8:
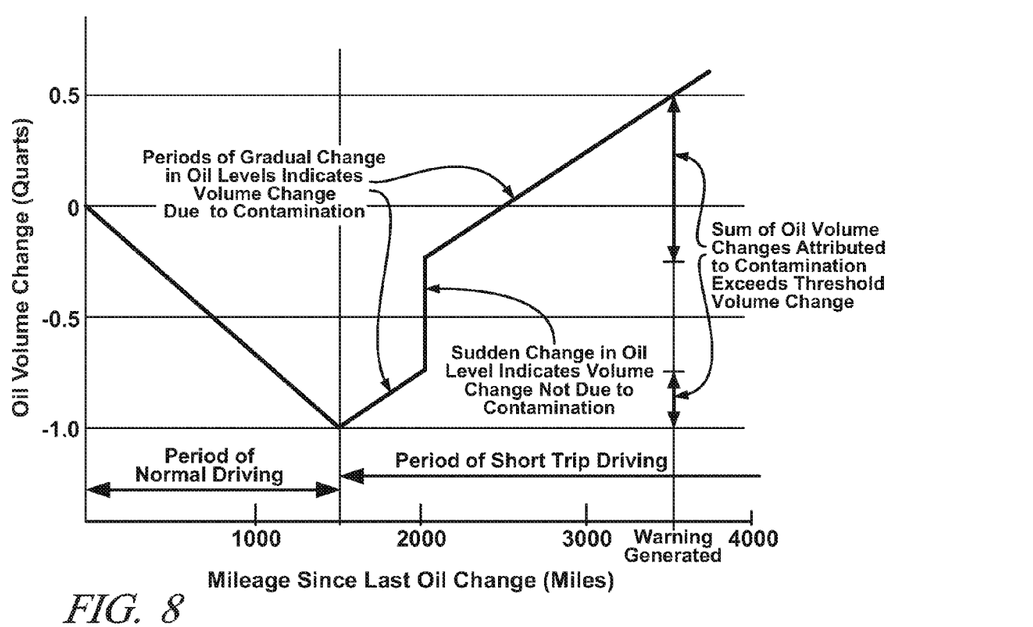

FIG. 8 depicts a vehicle operated under conditions similar to those depicted in FIG. 6, wherein a vehicle operated under normal conditions for a period and then operated under short trip driving conditions for a period, and FIG. 8 also depicts a sudden increase in oil level change consistent with a top-off event as depicted in FIG. 7. The oil volume change plotted on the chart initially decreases as expected under normal driving conditions. At a point, the period of normal driving ends and a period of short trip driving begins, and contaminants begin to build up within the oil. As a result, the oil volume change reverses and begins to increase gradually. This inflection point is identified and the threshold volume increase is measured from this inflection point. As the oil volume change begins to gradually increase, a sudden increase in oil level consistent with a top-off event is experienced. Because this sudden increase is inconsistent with gradual increases experienced due to short trip driving, the increase is not attributed to contamination. However, because the oil level change was gradually increasing before the sudden increase and continues to gradually increase after the sudden increase, these periods of gradual increase indicate a continuing period of short trip driving, and the gradual increases in oil level change are summed to estimate an overall contamination level. Once this overall contamination level exceeds the threshold volume change, a contamination warning is indicated.

Figure 9:
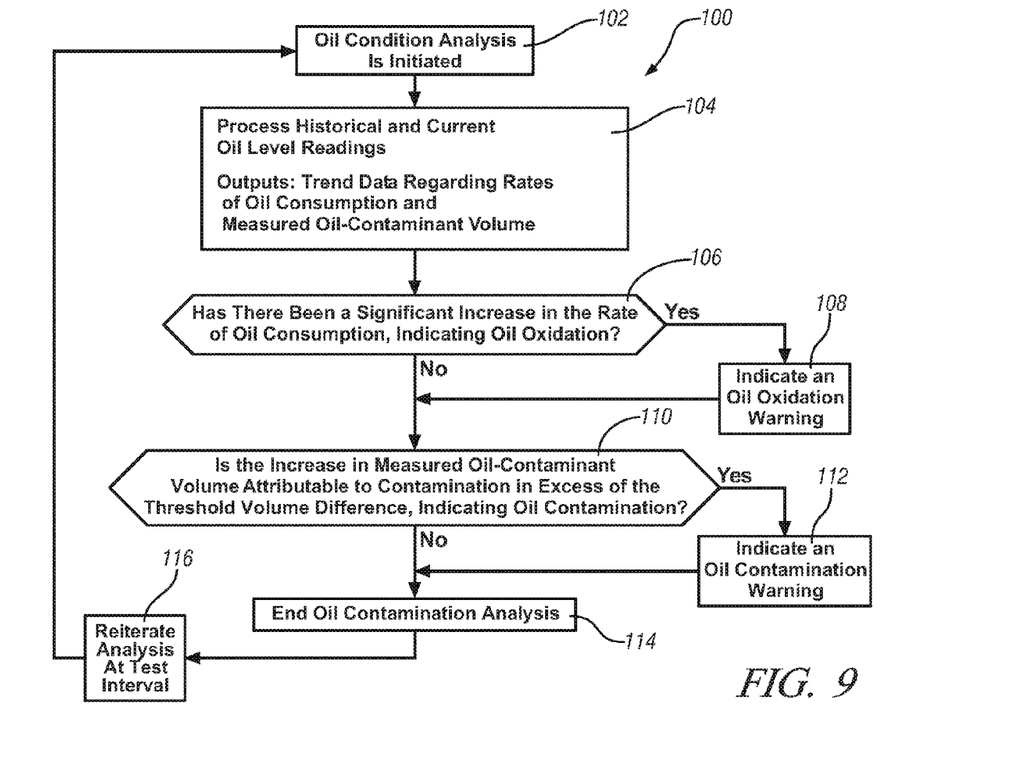
FIG. 9 is an exemplary flowchart illustrating a process whereby oil quality is estimated by analyzing oil level readings in accordance with the disclosure.

FIG. 9 illustrates an exemplary process 100 wherein oil level readings from oil level sensor 30 are analyzed to determine whether a sub-standard oil quality condition is indicated by either estimated oxidation levels or by estimated contaminant volumes in accordance with the disclosure. In step 102, the analysis of oil level data inputs is initiated. In step 104, data input readings stored in the memory of a control module are processed to generate trend data regarding rates of oil consumption and a trend analysis to identify any increase in oil volume. Values resulting from the processing of the data inputs regarding rates of oil consumption are analyzed at step 106, and the rate of oil consumption in the latest input samples are compared with historical or expected rates of oil consumption. If there is a significant increase in the rate of oil consumption over the historical or expected rates of consumption, then step 108 is executed and a warning indicating oil oxidation is generated. Values resulting from the processing of the data inputs regarding the trend analysis to identify any increase in oil volume are analyzed at step 110, and if the data indicates contamination in excess of the threshold volume increase, then step 112 is executed and a warning indicating oil contamination is generated. In step 114, the analysis of oil level data inputs is ended. The process 100 may be run intermittently during vehicle operation at some test interval, reinitiating at step 116, or process 100 may be initiated by some vehicle event such as an ignition cycle.

Warnings initiated by the above described method may take many forms. A warning may include an indicator light, an audible warning tone, a displayed message by a driver information device, or a warning conveyed over a communications network. In response to input data indicating an extreme or critical oil quality condition, the warning could initiate an ignition cycle denial to stop the engine from being critically damaged.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for diagnosis of oil quality for oil within an internal combustion engine, comprising:
monitoring an oil level sensor;
determining a rate of oil consumption based upon a plurality of readings of said oil level sensor;
continuously determining a trend in said rate of oil consumption, comprising:
monitoring a decline in said rate of oil consumption;
determining an inflection point when said rate of oil consumption begins to increase; and
determining an increase in said rate of oil consumption subsequent to said inflection point to exceed a threshold increase in said rate of oil consumption;
determining an oil oxidation condition based upon said trend in said rate of oil consumption indicating said increase in said rate of oil consumption exceeding said threshold increase in said rate of oil consumption; and
generating a warning based upon said oxidation condition;
wherein said threshold increase is selected to correlate to rapid oxidation indicating an anti-oxidation capability of said oil has been depleted;
wherein said threshold increase in said rate of oil consumption is defined by said rate of oil consumption increasing and exceeding a selected value.

2. The method of claim 1, wherein said warning comprises communication over a communications network.

3. An apparatus for diagnosing quality of oil within an internal combustion engine, comprising:
an oil level sensor; and
a control module:
monitoring an oil level through said oil level sensor;
continuously determining a trend in said oil level based upon said monitored oil level, comprising:
determining said oil level to begin to increase gradually; and
determining said oil level to continue to increase gradually, wherein said oil level continuing to increase gradually indicates a period of short trip driving;
determining said trend to indicate an oil contamination condition based upon said oil level continuing to increase gradually exceeding a threshold increase in oil level; and generating a warning based upon said oil contamination condition;
wherein said threshold increase in oil level is selected to indicate contamination corresponding to sustained short trip driving;
wherein said control module determining said oil level to begin to increase gradually comprises:
determining said oil level to decrease; and
determining said oil level to stop decreasing and subsequently begin to increase gradually.

4. The apparatus of claim 3, wherein said warning comprises communication over a communications network.

5. The apparatus of claim 3, wherein said control module determining said oil level to continue to increase gradually comprises not including a sudden increase in said oil level.

6. A method for diagnosis of oil quality within an internal combustion engine, comprising:
monitoring an oil level;
continuously determining a trend in said oil level based upon said monitored oil level, comprising:
determining said oil level to begin to increase gradually; and
determining said oil level to continue to increase gradually, wherein said oil level continuing to increase gradually indicates a period of short trip driving;
determining said trend to indicate an oil contamination condition based upon said oil level continuing to increase gradually exceeding a threshold increase in oil level; and
generating a warning based upon said oil contamination condition;
wherein said threshold increase in oil level is selected to indicate contamination corresponding to sustained short trip driving;
wherein determining said oil level to begin to increase gradually comprises:
determining said oil level to decrease; and
determining said oil level to stop decreasing and subsequently begin to increase gradually.

7. The method of claim 6, wherein determining said oil level to continue to increase gradually comprises not including a sudden increase in said oil level.

8. The method of claim 6, wherein generating said warning comprises communicating over a communications network.

9. The method of claim 6, further comprising:
determining a rate of oil consumption based upon a plurality of readings of said oil level;
continuously determining a trend in said rate of oil consumption, comprising:
monitoring a decline in said rate of oil consumption;
determining an inflection point when said rate of oil consumption begins to increase; and
determining an increase in said rate of oil consumption to exceed a threshold increase in said rate of oil consumption;

determining an oil oxidation condition based upon said trend in said rate of oil consumption indicating said increase in said rate of oil consumption exceeding said threshold increase in said rate of oil consumption; and
generating a warning based upon said oxidation condition; wherein said threshold increase is selected to correlate to rapid oxidation indicating an anti-oxidation capability of said oil has been depleted.

* * * * *